Patented July 4, 1944

2,352,853

UNITED STATES PATENT OFFICE 2,352,853

OXIDATION PRODUCTS FROM SAPOGENIN DERIVATIVES AND PREPARATION OF SAME

Russell Earl Marker, State College, Pa., assignor to Parke, Davis & Company, Detroit, Mich., a corporation of Michigan No Drawing. Application November 4, 1941, Serial No. 417,822

21 Claims. (Cl. 260—239.5)

In J. Am. Chem. Soc. 62, 518, 521 (1940) and later papers, there has been described the preparation of new classes of sapogenin derivatives, namely, pseudo-sapogenins and exo-dihydro-pseudo-sapogenins.

The present invention relates to new oxidation products derived from these sapogenin derivatives and forms a continuation in part of my pending application Serial No. 382,452, filed March 8, 1941. These new oxidation products are $C_{27}$ acids having the same number of carbon atoms as the sapogenins from which they are derived, and hence they are herein designated as $C_{27}$ acids. These $C_{27}$ acids are useful intermediates for the preparation of steroidal hormones since they may readily be oxidized to give $\Delta^{16}$-20-keto-pregnene compounds.

In J. Am. Chem. Soc. 62, 518 (1940) and later papers, it is shown that when steroidal sapogenins are treated, for example, with acid anhydrides for about six to fifteen hours at about 200° C., the steroidal sapogenins are isomerized and simultaneously acylated in the side chain to form pesudo-sapogenin exo-acylates, which may be hydrolyzed with alkalis to give pseudo-sapogenins. The structure of the pseudo-sapogenins is not known with certainty. It is believed, however, that they have in the side chain the following structure:

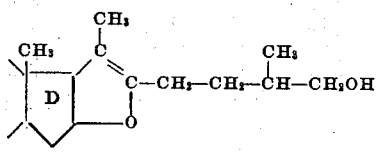

I

When the pseudo-sapogenins are hydrogenated, for example, by shaking a pseudo-sapogenin in acetic acid solution with hydrogen in the presence of a platinum oxide catalyst, there is obtained a new class of compounds which I have designated as exo-dihydro-pseudo-sapogenins. The structure of the side chain of these exo-dihydro-pseudo-sapogenins is not known with certainty. It is believed, however, that most of the reactions of these substances may be explained by the following structure:

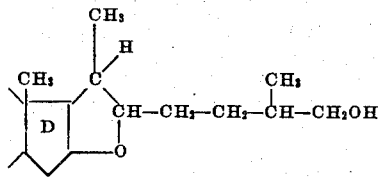

II

Now I have found that the exo-dihydro-pseudo-sapogenins may be oxidized under mild conditions to give $C_{27}$ acids having the same number of carbon atoms as the steroidal sapogenins from which they are derived. It is believed that these new $C_{27}$ acids may be represented by the following partial structural formula:

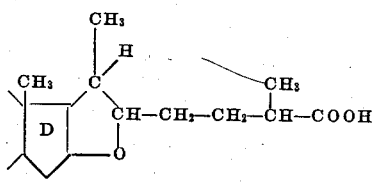

III

The new $C_{27}$ acids of this invention have an inert oxygen atom and a carboxyl group in the side chain. They are best prepared by oxidizing the exo-dihydro-pseudo-sapogenins unacylated in the side chain with a limited amount of chromic anhydride in acetic acid at about 15–18° C. However, instead of using chromic anhydride, other oxidizing agents may be used such as sodium dichromate and sulfuric acid, or other oxidizing agents selected from the group consisting of chromic acid and its soluble salts.

The new $C_{27}$ acids of my invention are readily oxidized to yield $\Delta^{16}$-20-keto-pregnene compounds. This oxidation is best accomplished by using an excess of chromic acid in acetic acid and conducting the oxidation at about 25–30° C.

My invention is more fully illustrated by the following examples:

Example 1

(a) Exo-dihydro-pseudo-sarsasapogenin is prepared, for example, as described in J. Am. Chem. Soc. 62, 521 (1940), by heating sarsasapogenin with acetic anhydride for six to fifteen hours at about 200° C., hydrolyzing with alkali, and then hydrogenating the product in the presence of acetic acid and a platinum oxide catalyst.

(b) To a solution of 4 g. of exo-dihydro-pseudo-sarsasapogenin in 200 cc. of acetic acid at 15° C. is added a solution of 6 g. of chromic anhydride in 50 cc. of 80% acetic acid. After the mixture has stood at 15–18° C. for ninety minutes a large volume of water is added and the mixture shaken with ether. The ethereal layer is separated and washed with water and 3% sodium hydroxide solution. The aqueous alkaline layer is separated and acidified with hydrochloric acid. The precipitated acid is extracted with ether, the ether evaporated on a steam bath, and the residue crystallized from acetone to give small white needles of M. P. 233–236° C.

*Anal.*—Found: C, 75.3, 75.1; H, 9.4, 9.6. Calcd. for $C_{27}H_{42}O_4$; C, 75.3; H, 9.6.

This corresponds to an acid of the probable formula:

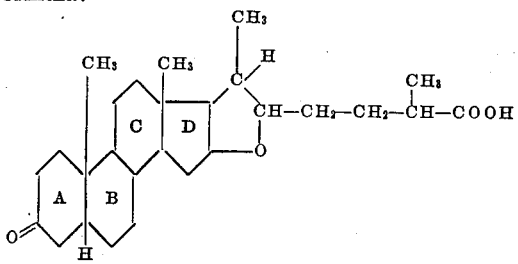

The above acid, when treated with alcoholic semicarbazide acetate in the usual manner, gives a semicarbazone which may be crystallized from alcohol. Thus the semicarbazone is obtained as small white crystals of M. P. 236° C. dec.

Anal.—Found: C, 67.7; H, 9.3. Calcd. for $C_{28}H_{45}O_4N_3$: C, 68.9; H, 9.3.

The oxime may be prepared by refluxing the $C_{27}$ acid in alcohol with an excess of hydroxylamine hydrochloride and of sodium acetate for one hour, diluting the reaction mixture with water, and collecting and crystallizing the product from methanol. This oxime melts with decomposition at 230–231° C.

When the $C_{27}$ acid is dissolved in ether-methanol and treated with ethereal diazomethane solution, and the mixture worked up in the usual manner, there is obtained the methyl ester. After crystallization from pentane, it is obtained as small white needles of M. P. 115° C.

The above methyl ester, when treated with alcoholic semicarbazide acetate, forms a semicarbazone which, after crystallization from methanol, melts with decomposition at 225° C.

The ethereal extract from the aqueous sodium carbonate-ether partition described in the first paragraph of (b) above, yields, after evaporating the ether, a residue which may be crystallized from acetone to give $\Delta^{16}$-pregnenedione-3,20 as white plates at M. P. 199–201° C.

(c) To a solution of 250 mg. of the above $C_{27}$ acid there is added a solution of 250 mg. chromic anhydride in 5 cc. of 80% acetic acid. After the mixture has stood at 25° C. for seventy-five minutes, water is added and the precipitate taken up in ether. The ethereal layer is separated, washed with water and with sodium hydroxide solution. Evaporation of the ether gives a residue which, after crystallization from acetone, yields white plates of $\Delta^{16}$-pregnenedione-3,20, M. P. 199–201° C.

The structure of the above $C_{27}$ acid appears to be supported by its reduction to exo-dihydro-pseudo-epi-sarsasapogenin as follows:

Two-and-a-half grams of sodium metal are added in small pieces to a solution of 2.0 g. of the methyl ester of the above $C_{27}$ acid in 20 cc. of absolute alcohol which has previously been dried over magnesium methylate. After all the sodium has been added, the solution is boiled for an hour, and then an additional 25 cc. of absolute alcohol and an additional 2 g. of sodium are added. After the mixture has boiled for two more hours, it is poured into water, extracted with ether and the ethereal solution washed with water and evaporated to dryness. The syrupy residue is dried by distilling benzene from it, and then it is dissolved in dry pyridine and an excess of p-nitrobenzoyl chloride added. The next day the mixture is poured into dilute sulfuric acid and extracted with ether. The ethereal layer is separated, washed well with sodium carbonate solution, and the ether removed on a steam bath. The residue is crystallized from acetone and thereby yields the bis-p-nitrobenzoate of exo-dihydro-pseudo-epi-sarsasapogenin, M. P. 206–208° C.

Example 2

(a) Exo-dihydro-pseudo-tigogenin may be prepared as described, for example, in J. Am. Chem. Soc., 62, 2525 (1940).

(b) To a solution of 25 g. of exo-dihydro-pseudo-tigogenin in 25 cc. of acetic acid cooled to 15° C. is added slowly a solution of 20 g. of chromic anhydride dissolved in a mixture of 20 cc. of water and 80 cc. of acetic acid. The temperature is maintained throughout the addition and for an hour afterwards at 15–18° C. At the end of that time, water is added and the mixture extracted well with ether. To the ethereal solution is added 1 N sodium hydroxide solution and the mixture filtered. The filtrate which forms two layers is separated and the aqueous layer combined with the residue on the filter paper which is the insoluble potassium salt of the desired acid. Then the aqueous alkaline mixture is allowed to stand for fifteen minutes and then acidified with 2 N hydrochloric acids. The mixture then is extracted well with ether and the ether removed on a steam bath. The residue is crystallized from ether and ethyl acetate to give a $C_{27}$ acid of M. P. 207–209° C.

Anal.—Found: C, 75.2; H, 9.7. Calcd. for $C_{27}H_{42}O_4$: C, 75.3; H, 9.6.

This corresponds to an acid of the probable formula:

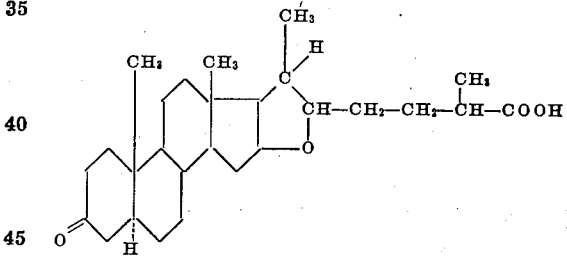

The above $C_{27}$ acid may be treated with diazomethane in ether-methanol according to the usual manner, to give a methyl ester which, after crystallization from methanol, melts at 138° C.

With semicarbazide acetate, the above $C_{27}$ acid forms a semicarbazone which, after crystallization from alcohol, melts with decomposition at 210–213° C.

The above $C_{27}$ acid forms an oxime which, after crystallization from methanol, is obtained as colorless needles, M. P. 232–234° C. (dec.).

The ethereal extract from the alkali-ether partition above may be evaporated to give a residue which, after crystallization from acetone, yields $\Delta^{16}$-allo-pregnenedione-3,20 of M. P. 210–213° C.

(c) When the above $C_{27}$ acid is oxidized according to the directions of Example 1c, there is obtained $\Delta^{16}$-allo-pregnenedione-3,20 of M. P. 210–213° C.

Example 3

To a refluxing solution of 1 g. of the $C_{27}$ acid obtained from the oxidation of exo-dihydro-pseudo-tigogenin (Example 2b) in 250 cc. of alcohol containing 40 g. of amalgamated 20 mesh zinc is added 70 cc. of concentrated hydrochloric acid over a period of three hours. After the mixture has refluxed for one hour more, it is poured into water and extracted with ether. The ethereal extract is washed with water and sodium carbonate solution and then the ether is removed on a steam bath. The residue is crystallized from methanol to give a C₂₇ acid, M. P. 81.5–82.5° C.

*Anal.*—Found: C, 78.1; H, 10.7. Calcd. for C₂₇H₄₄O₃: C, 77.8; H, 10.6.

This acid can be represented by the formula:

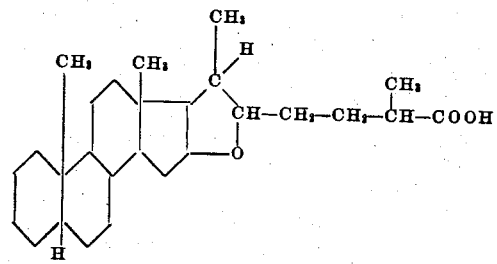

Example 4

The C₂₇ acid from the oxidation of exo-dihydro-pseudo-sarsasapogenin can be catalytically hydrogenated to yield a mixture of the corresponding epimeric 3-hydroxy acids as follows:

A mixture of 1 g. of the C₂₇ keto acid (Example 1b) and 0.5 g. of platinum oxide catalyst in 200 cc. of absolute alcohol is shaken with hydrogen at 3 atmospheres pressure at room temperature for two hours. Then the catalyst is removed by filtration, and the filtrate is diluted with 200 cc. of alcohol. To this is added a hot solution of 8 g. of digitonin in 500 cc. of 85% alcohol. After standing overnight, the digitonide which has separated is collected. Thus, there is obtained a filtrate containing the 3(α)-hydroxy steroids and a solid digitonide containing the 3(β)-hydroxy steroids. These are worked up as follows:

The solid digitonide is dissolved by warming with about 6 parts of dry pyridine on a steam bath for one-half hour. The mixture is diluted with about 40 parts of ether, the precipitated digitonin removed by filtration and the ethereal filtrate washed well with dilute sulfuric acid and with water. The dried ethereal extract is distilled on a steam bath and the residue is crystallized from acetone to yield a 3(β)-hydroxy C₂₇ acid of M. P. 188–189° C. and of probable formula:

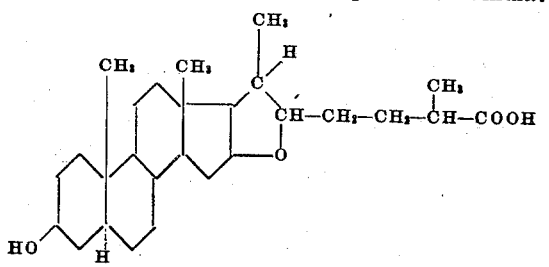

The alcohol filtrate from the digitonide separation is evaporated to dryness, extracted with ether and the ethereal extract washed well with water. The ethereal extract is evaporated on a steam bath and the residue crystallized from ether to give a 3(α)-hydroxy C₂₇ acid of M. P. 181–183° C. and of probable formula:

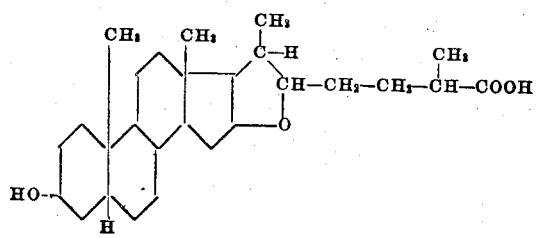

The above 3(α)-hydroxy C₂₇ acid on treatment with acetic anhydride in pyridine yields a monoacetate, which, after crystallization from methanol, has M. P. 197–199° C.

Example 5

A mixture of 1 g. of the C₂₇ acid from the oxidation of exo-dihydro-pseudo-tigogenin (Example 2b) and 0.5 g. of platinum oxide catalyst in 200 cc. of absolute alcohol is shaken with hydrogen at 3 atmospheres pressure at room temperature for two hours. Then the catalyst is removed by filtration and the filtrate evaporated to dryness. The residue, after crystallization from methanol, gives a 3(β)-hydroxy C₂₇ acid of M. P. 240–242° C. It may be represented by the following structural formula:

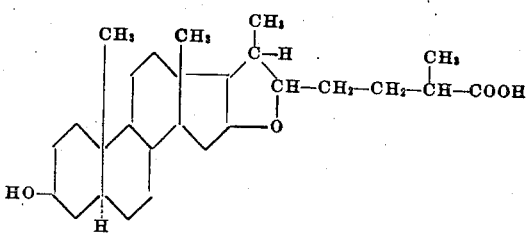

On refluxing with acetic anhydride, there is obtained the monoacetate of this acid. After crystallization from ethyl acetate, this monoacetate has M. P. 193–195° C.

Instead of using exo-dihydro-pseudo-sarsasapogenin or exo-dihydro-pseudo-tigogenin in the above examples, there may be used other exo-dihydro-pseudo-sapogenins unacylated in the side chain, such as exo-dihydro-pseudo-chlorogenin, exo-dihydro-pseudo-3-desoxysarsasapogenin, exo-dihydro-pseudo-tigogenyl-chloride and the like.

These give rise to the formation, respectively, of compounds such as the following:

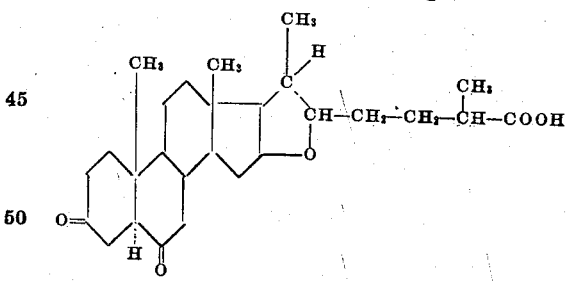

and

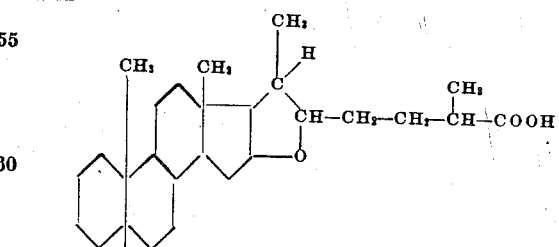

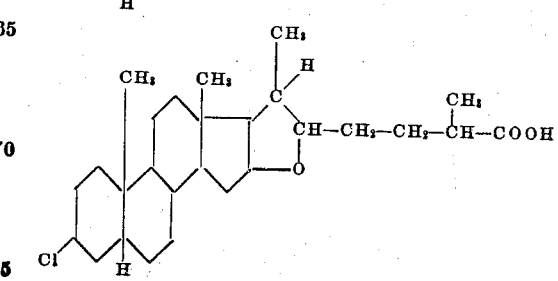

In view of what has now been set forth, it will be clear that my invention comprehends a new class of steroids, characterized by being capable of formation by the mild oxidation of exo-dihydro-pseudo-sapogenins unacylated in the side chain; and further characterized by containing in the side chain attached to ring D, an inert oxygen atom and a carboxylic acid group, the latter being capable of reacting readily with carboxylic acid reagents.

An especially valuable group of these new steroids consists of those which are simply obtainable from the three readily available sapogenins; namely, sarsasapogenin, diosgenin, and chlorogenin. This preferred sub-group is representable by the formula:

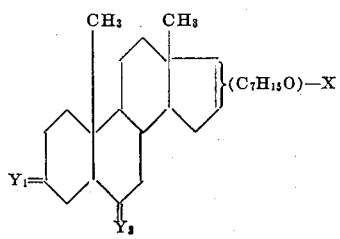

where X is a member of the class consisting of —COOH and group hydrolyzable to —COOH; and where $Y_1$ and $Y_2$ are members of the class consisting of

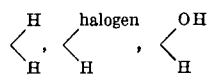

groups hydrolyzable to

(=O), and groups hydrolyzable to (=O).

It will also be appreciated that my invention comprehends the preparation of oxidation products of sapogenin derivatives by mildly oxidizing an exo-dihydro-pseudo-sapogenin unacylated in the side chain, separating the $C_{27}$ acid thus formed, and oxidizing it under somewhat more vigorous conditions to give a $\Delta^{16}$-20-keto pregnene compound.

The oxidation of the exo-dihydro-pseudo-sapogenin is best accomplished by treating it below 25° C. with a member of the group consisting of chromic acid and its soluble salts, and particularly satisfactory results are obtained by using chromic anhydride in acetic acid and maintaining the reaction temperature at 15–18° C.

The oxidation of the $C_{27}$ acid is readily effected using, for example, chromic anhydride in acetic acid and maintaining the reaction temperature at 25–30° C.

While I have described and illustrated certain forms of my invention and have set these forth in terms of a particular theory, I wish it to be understood that my invention is not to be limited to these forms, nor is its operability in any wise affected by the ultimate correctness of the particular theory herein employed.

What I claim as my invention is:

1. The process for the preparation of oxidation products of sapogenin derivatives which comprises oxidizing below 25° C. an exo-dihydro-pseudo-sapogenin unacylated in the side chain, separating the $C_{27}$ acid thus formed, and oxidizing it above 25° C. to give a $\Delta^{16}$-20-keto-pregnene compound.

2. The process for the preparation of oxidation products of sapogenin derivatives which comprises oxidizing an exo-dihydro-pseudo-sapogenin unacylated in the side chain below 25° C. with a member of the group consisting of chromic acid and its soluble salts, separating the $C_{27}$ acid thus formed, and oxidizing it above 25° C. to give a $\Delta^{16}$-20-keto-pregnene compound.

3. The process for the preparation of oxidation products of sapogenin derivatives which comprises oxidizing an exo-dihydro-pseudo-sapogenin unacylated in the side chain with chromic anhydride in acetic acid at 15–18° C., separating the $C_{27}$ acid thus formed, and oxidizing it with chromic anhydride in acetic acid at 25–30° C., to give a $\Delta^{16}$-20-keto-pregnene compound.

4. The process for the preparation of oxidation products of sapogenin derivatives which comprises oxidizing below 25° C. an exo-dihydro-psuedo-sapogenin unacylated in the side chain and separating the $C_{27}$ acid thus formed.

5. The process for the preparation of oxidation products of sapogenin derivatives which comprises oxidizing an exo-dihydro-pseudo-sapogenin unacylated in the side chain below 25° C. with a member of the group consisting of chromic acid and its soluble salts and separating the $C_{27}$ acid thus formed.

6. The process for the preparation of oxidation products of sapogenin derivatives which comprises oxidizing an exo-dihydro-pseudo-sapogenin unacylated in the side chain with chromic anhydride in acetic acid at 15–18° C. and separating the $C_{27}$ acid thus formed.

7. The process for the preparation of oxidation products of sapogenin derivatives which comprises oxidizing an exo-dihydro-pseudo-sapogenin unacylated in the side chain and having in rings A and B the structure

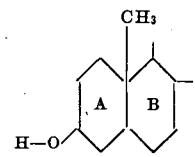

below 25° C. with a member of the group consisting of chromic acid and its soluble salts, separating the $C_{27}$ acid thus formed, and oxidizing it above 25° C. to give a compound of the structure

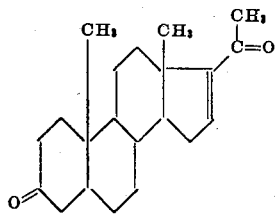

8. The process for the preparation of oxidation products of sapogenin derivatives which comprises oxidizing an exo-dihydro-pseudo-sapogenin unacylated in the side chain and having in rings A and B the structure

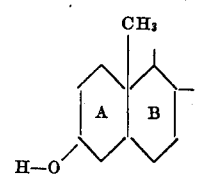

below 25° C. with a member of the group consisting of chromic acid and its soluble salts and separating the $C_{27}$ acid thus formed.

9. The process for the preparation of oxidation products of sapogenin derivatives which comprises oxidizing exo-dihydro-pseudo-sarsasapogenin with chromic anhydride in acetic acid at 15–18° C., separating the $C_{27}$ acid thus formed, and oxidizing it with chromic anhydride in acetic acid at 25–30° C. to give $\Delta^{16}$-pregnenedione-3,20.

10. The process for the preparation of oxidation products of sapogenin derivatives which comprises oxidizing exo - dihydro - pseudo - sarsasapogenin with chromic anhydride in acetic acid at 15–18° C. and separating the $C_{27}$ acid thus formed.

11. In a process for the preparation of oxidation products of sapogenin derivatives which comprises oxidizing an exo-dihydro-pseudo-sapogenin unacylated in the side chain, separating the $C_{27}$ acid thus formed, and oxidizing it to give a $\Delta^{16}$-20-keto-pregnene compound, the step which comprises oxidizing the $C_{27}$ acid above 25° C. to give a $\Delta^{16}$-20-keto-pregnene compound.

12. The process for preparing a $\Delta^{16}$-20-keto-pregnene compound which comprises oxidizing at 25–30° C., with a member of the group consisting of chromic acid and its soluble salts, a steroid having in ring D the structure

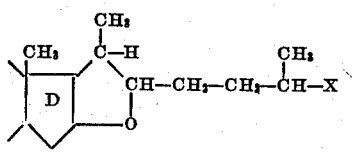

where X is a member of the class consisting of —COOH and groups hydrolyzable to —COOH.

13. The process for preparing a compound having in ring D the structure

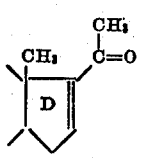

which comprises oxidizing at 25–30° C., a steroid having the structure

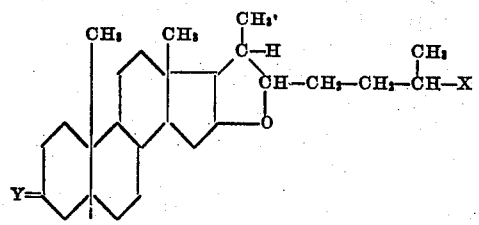

where X is a member of the class consisting of —COOH and groups hydrolyzable to —COOH and where Y is a member of the class consisting of

and (=O), with a member of the group consisting of chromic acid and its soluble salts.

14. A steroidal acid melting at approximately 188–189° C., having a 3-(β)-hydroxyl group, having the composition $C_{27}H_{44}O_4$, and having the structure

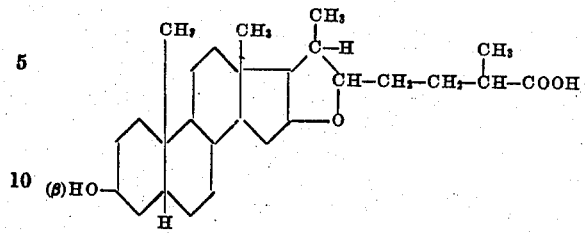

15. A steroidal acid melting at approximately 181–183° C., having a 3-(α)-hydroxyl group, having the composition $C_{27}H_{44}O_4$, and forming an acetate melting at approximately 197–199° C., said steroidal acid having the structure

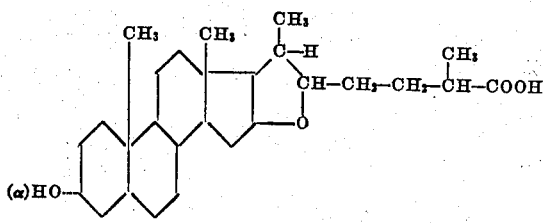

16. A steroidal acid melting at approximately 233–236° C. having the structure

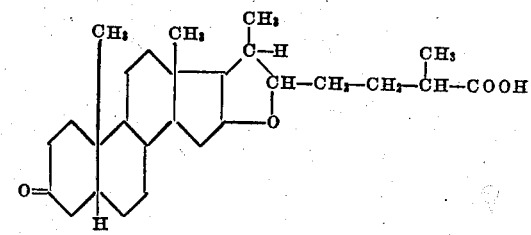

17. A steroid having in ring D the structure

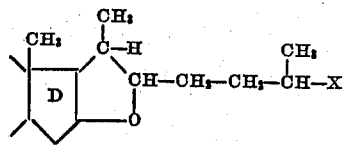

where X is a member of the class consisting of —COOH and groups hydrolyzable to —COOH.

18. A steroid having in ring D the structure

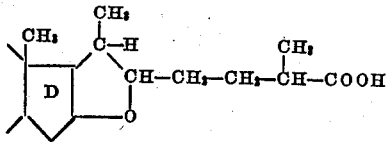

19. A steroid having the formula

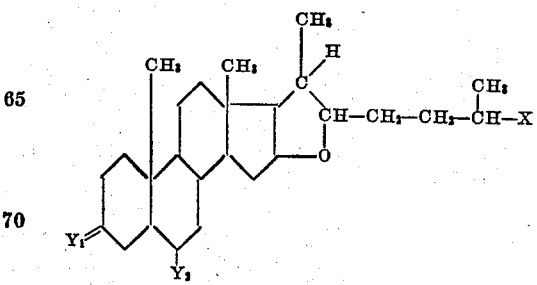

where X is a member of the class consisting of —COOH and groups hydrolyzable to —COOH, and where $Y_1$ and $Y_2$ are members of the class consisting of
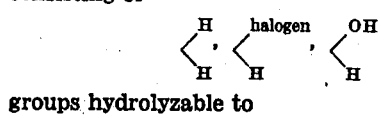
groups hydrolyzable to
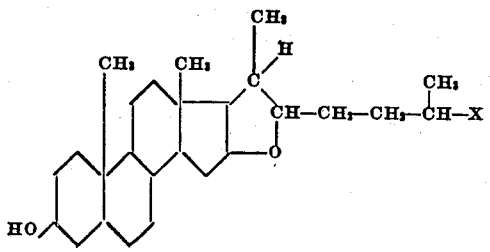
(=O), and groups hydrolyzable to (=O).
20. A steroid having the formula
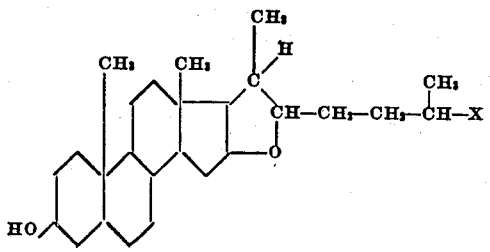
where X is a member of the class consisting of —COOH and groups hydrolyzable to —COOH.
21. A steroid having the formula
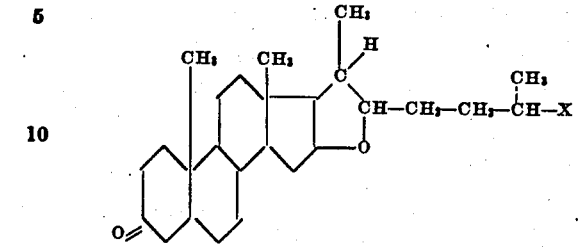
where X is a member of the class consisting of —COOH and groups hydrolyzable to —COOH.
RUSSELL EARL MARKER.